Aug. 14, 1951 — C. H. KRUEGER — 2,564,535
WINDSHIELD WIPER
Filed Dec. 1, 1948 — 2 Sheets-Sheet 1

INVENTOR.
Clarence H. Krueger
BY Victor J. Evans & Co.
ATTORNEYS

Aug. 14, 1951
C. H. KRUEGER
2,564,535
WINDSHIELD WIPER
Filed Dec. 1, 1948
2 Sheets-Sheet 2
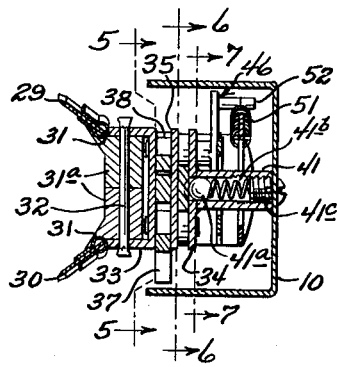
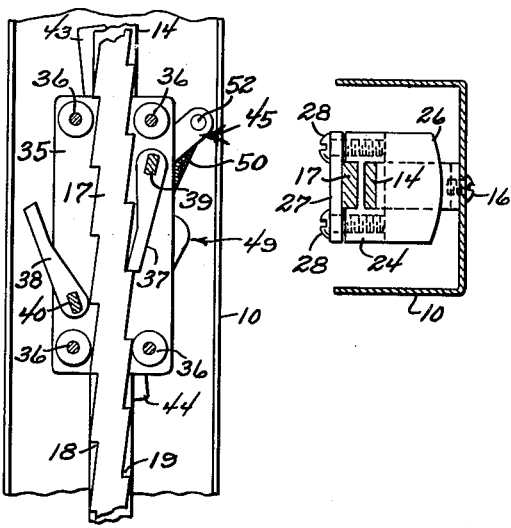
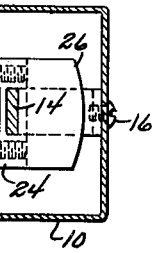
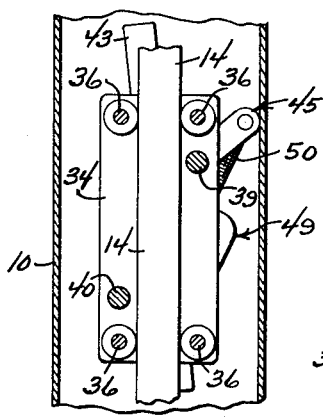
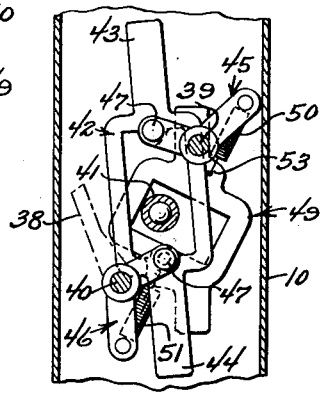
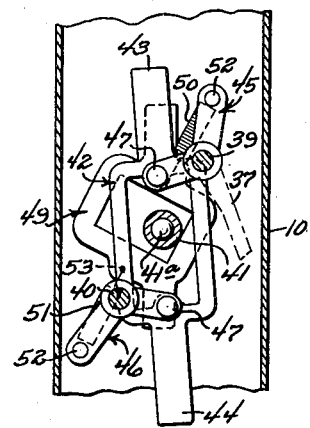
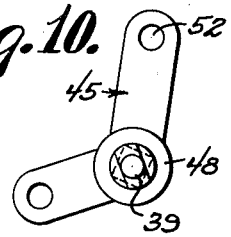
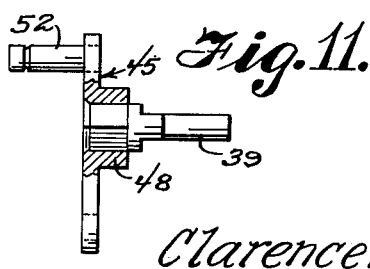
INVENTOR.
Clarence H. Krueger
BY Victor J. Evans & Co.
ATTORNEYS Patented Aug. 14, 1951

2,564,535

UNITED STATES PATENT OFFICE 2,564,535

WINDSHIELD WIPER

Clarence H. Krueger, Bovey, Minn.

Application December 1, 1948, Serial No. 62,869

1 Claim. (Cl. 15—255)

My present invention relates to the general class of window or windshield cleaners of the power operated type and more specifically to an improved windshield wiper having an oscillating or swinging stroke combined with a reciprocable radial movement whereby successive concentric swaths or paths of the windshield surface are cleaned to insure an extensive and clear vision. The implement, as an attachment for an automobile or car, may be suspended from the top portion of a car to swing below its pivot, or it may be installed in upright position to swing above its pivotal axis, and an intermittently movable carrier is equipped for use with plural and opposed interchangeable ice scrapers or blades, as well as for use with flexible wipers. Means are employed for readily adjusting and adapting the unitary attachment to various types of cars, and means are provided for adjusting the tension of the cleaners to maintain them in operative condition.

The invention consists in certain novel combinations and arrangements of parts as will hereinafter be described and more particularly pointed out in the appended claim.

In the accompanying drawings I have illustrated a complete example of a physical embodiment of my invention wherein the parts are combined and arranged in accord with one mode I have devised for the practical application of the principles of my invention. It will however be understood that changes and alterations are contemplated and may be made in these exemplifying drawings and mechanical structures, within the scope of my claim, without departing from the principles of the invention.

Figure 2:
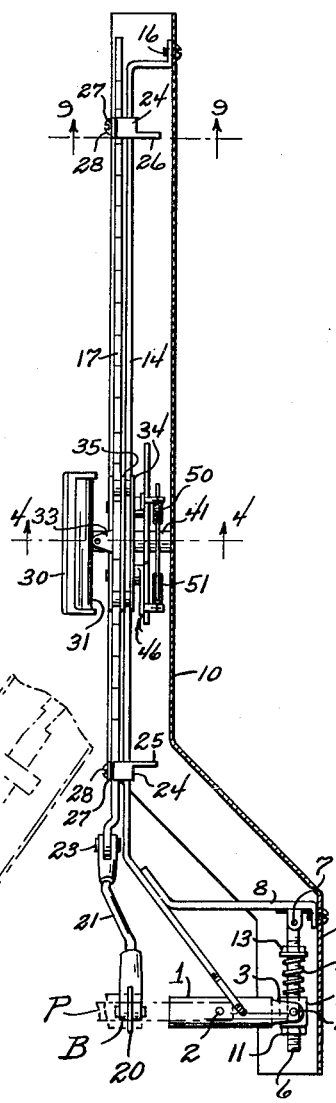
Figure 2 is a vertical sectional view at line 2—2 of Fig. 1.
Figure 3:
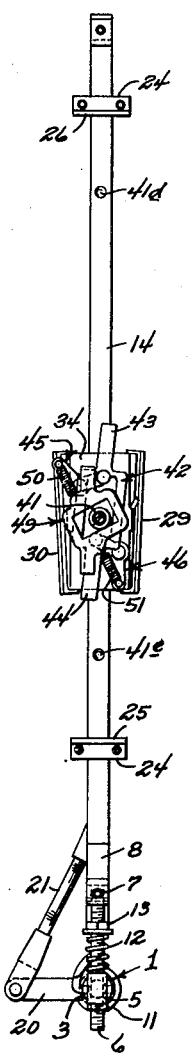
Figure 3 is a view in elevation showing the guide post, the carrier, and the automatic reversing means for the reciprocable carrier.

Figure 4 is an enlarged transverse sectional view at line 4—4 of Fig. 2. Figure 5 is a vertical detail sectional view at line 5—5 of Fig. 4; and Figure 6 is a similar view at line 6—6 of Fig. 4.

Figure 7 is a detail view at line 7—7 of Fig. 4 showing one position of the automatic reversing mechanism; and Figure 8 is a similar view with the mechanism in alternate position.

Figure 9 is a transverse sectional view at line 9—9 of Fig. 2; and Figures 10 and 11 are detail views of parts of the reversing mechanism.

Figure 1:
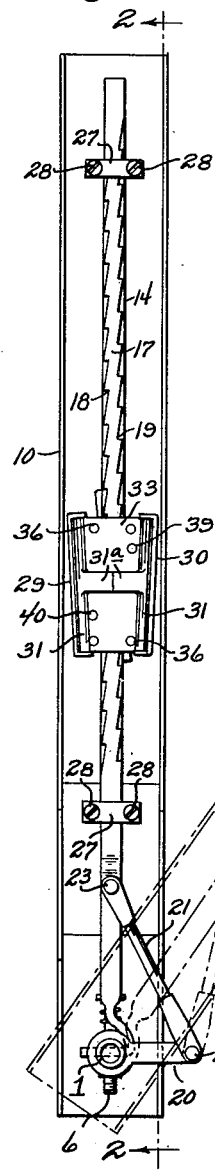
Figure 1 is an inner face view in elevation of a windshield wiper embodying my invention.

The attachment may be installed exterior of the windshield, to receive power from a suitable power shaft P that is mounted in a stationary bearing bushing or housing B which projects through the front portion of the automobile or car body, as indicated by dotted lines in Fig. 2, and the implement is mounted on the power shaft which extends beyond the end of the housing by means of a coupling sleeve 1, fixed by a cotter pin 2 to the power shaft. The power shaft swings or oscillates the implement, as indicated by dotted lines in Fig. 1.

The coupling sleeve 1 is provided with a forked outer end 3 and pivotally mounted by pin 4 upon an upright sleeve or collar 5 loosely surrounding a screw bolt 6 that is pivotally suspended at its upper end 7 from a bracket arm or brace 8 that is mounted within the outset or angular section 9 of an upright enclosing housing 10 which is channel shaped in cross section, open at its inner side, and at both ends, in order that it may readily be vented.

The coupling sleeve 1 may readily be adjusted to the power shaft, and for adjusting the resilient tension that holds the cleaners in operative contact with the windshield, an adjusting nut 11 is threaded on the lower end of the bolt below the collar 5, and a spring 12 is coiled about the bolt and interposed between the collar 5 and another nut 13 on the upper portion of the screw bolt. By this arrangement the housing and its operating parts may be adjusted inwardly toward the windshield, or outwardly from the windshield, by turning the nut 11 and swinging the housing on its pivot 4; and in adjusted position, the coupling sleeve 1 oscillates with the power shaft to swing the implement with the power shaft as its axis of movement. Within the housing is mounted a fixed guide post 14 in the form of a flat metal strip which is rigidly attached at its lower end to the coupling sleeve or bushing 1 where it is braced by the bracket arm 8, and its upper end is attached within the housing as by screw 16.

The guide post affords a support for a parallel and spaced reciprocable actuator or rack bar 17 equipped at its opposite edges with two series of staggered and oppositely arranged teeth forming racks 18 and 19, and this actuator or rack bar is slidably mounted upon the guide post, and operated from the power shaft P which oscillates the guide post 14 and housing 10 with the crank arm 20 stationary whereby the rack bar 17 is actuated by the link 21. The inner end of the crank arm 20 is fixedly mounted on the housing B which is indicated by dotted lines in Figure 2 and the link 21 is pivotally connected to the outer end of the arm 20 by a pin 22, and also pivoted at 23 to the lower end of the rack bar or actuator 17.

The rack bar or actuator is equipped with two spaced guide brackets 24, 24, slidable on the guide post, and each guide bracket is provided with a stop lug or detent as 25 and 26. The guide brackets are clamped on the actuator by means of clamp plates 27 and screws 28.

As here shown, the plural cleaners, are illustrated in Fig. 4 as scraper blades 29 and 30, which may be interchanged with flexible wipers, and mounted by their spring clips or holders 31, and hubs 31a, upon a hinge pin 32 transversely supported in a flanged front plate 33 of a carrier that is slidably mounted on the guide post and the dual rack bar, and intermittently movable to reciprocate radially of the power shaft P. The carrier is actuated by the dual rack bar or jack bar, and the latter is operated by the crank 20 and the link 21, as described.

In addition to the front channel plate 33 of the carrier, it also includes a spaced back plate 34, and an intermediate spaced plate 35, the three spaced plates being united by screws as 36.

Between the spaced carrier plates 33 and 35, two oppositely acting pawls 37 and 38 are mounted and pivoted at 39 and 40 respectively for alternate coaction with the teeth of the staggered racks 19 and 18 of the actuator.

In Fig. 5, while pawl 38 is inoperative, and on the upstroke of the actuator, rack 19 coacts with pawl 37 to lift the carrier one step, until the successive steps move the carrier to the end of its upward movement, and by coaction of the carrier with stop or detent 26 pawl 37 is automatically disengaged from rack 19, and pawl 38 is simultaneously moved into operative relation and engagement with the teeth of rack 18.

Now, by the reciprocating movement of the actuator and coaction of the rack 18 with pawl 38, the carrier is automatically and intermittently lowered until the carrier contacts with detent 25. This contact causes pawl 38 to be tripped to inoperative position, and pawl 37 is simultaneously restored into coaction with rack 19 for a return step by step movement of the carrier and its scrapers.

For controlling and automatically reversing the travel of the carrier, as it swings with the housing, the carrier is equipped with mechanism shown in Figs. 7 and 8 that shifts the two pawls, alternately, into and out of operative relation with the dual rack bar, at the opposite ends of the reciprocating movement of the carrier.

For this purpose the back plate 34 of the carrier is equipped with a rigidly mounted tube or tubular stud 41 upon which an open center, floating pawl-reversing frame 42 is transversely and loosely mounted; and this reversing frame is fashioned with two oppositely projecting lugs 43 and 44 for alternate contact and coaction with the stops 25 and 26.

At the opposite ends of the reciprocating movements of the carriage or carrier, it is resiliently retained until the tripping mechanism operates, preparatory for a reverse movement of the carrier. For this purpose a ball detent 41a is mounted in the tubular stud 41 and resiliently pressed by spring 41b, and an adjusting and retaining screw 41c is threaded in the open end of the tube to hold the spring under proper tension.

The spring pressed pawl or ball detent alternately coacts with two spaced sockets or dents 41d and 41e in the surface of the bar 14 to temporarily hold or retain the carrier while the reversing mechanism is operating.

A pair of bell crank levers 45 and 46 are each pivoted at 47 in spaced relation on the floating frame 42 and the pivots 39 and 40 of pawls 37 and 38 are fixed in hubs 48 of the bell crank levers.

For actuating the pawl reversing frame by a resilient snap movement in combination with the bell crank levers an open center shifting frame 49 is also transversely mounted on the tubular stud 41 and snap springs 50 and 51 are each anchored at one end to pins 52 of the bell crank levers with their other ends attached at 53 to the shift frame 49.

As one of the lugs of the reversing frame contacts a stop, the reversing frame is moved to actuate the crank arms, and the shifting frame is thus moved transversely across the stud 41 to snap one pawl out of engagement with its rack, and the other pawl into engagement with its rack.

Having thus fully described my invention, what I claim as new and desire to secure by Letters Patent is:

In a windshield cleaner, the combination which comprises an oscillating pivotally mounted arm, a jack bar having ratchet teeth in the edges thereof slidably mounted for reciprocating longitudinal movement on said arm, the teeth in one edge of the bar being positioned opposite to the teeth in the opposite edge, a carrier slidably mounted on the jack bar, scraper blades mounted on the carrier and positioned to scrape the surface of a windshield upon which the cleaner is mounted, pawls pivotally mounted in opposite sides of the carrier and positioned to coact with the ratchet teeth in the opposite edges of the jack bar, means longitudinally reciprocating the said jack bar as the arm reciprocates from one position to another, trip means positioned at the opposite ends of the arm for changing the positions of the pawls as the carrier reaches the ends of the arm to reverse the direction of travel of the carrier whereby the scraper blades travel along the arm as the arm swings with a reciprocating movement, and pivotal mounting means on the end of the arm.

CLARENCE H. KRUEGER.

REFERENCES CITED

The following references are of record in the file of this patent:

UNITED STATES PATENTS

| Number | Name | Date |
| --- | --- | --- |
| 624,843 | Mitchell | May 9, 1899 |
| 699,042 | Vain | Apr. 29, 1902 |
| 1,259,479 | Bertolini | Mar. 19, 1918 |